United States Patent
Aust et al.

(10) Patent No.: US 7,088,766 B2
(45) Date of Patent: Aug. 8, 2006

(54) DYNAMIC MEASUREMENT OF COMMUNICATION CHANNEL CHARACTERISTICS USING DIRECT SEQUENCE SPREAD SPECTRUM (DSSS) SYSTEMS, METHODS AND PROGRAM PRODUCTS

(75) Inventors: Carrie E. Aust, Morrisville, NC (US); Hayden C. Cranford, Jr., Apex, NC (US); Martin L. Schmatz, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 10/014,455

(22) Filed: Dec. 14, 2001

(65) Prior Publication Data

US 2003/0112851 A1 Jun. 19, 2003

(51) Int. Cl.
*H04B 1/69* (2006.01)
*H04B 1/707* (2006.01)

(52) U.S. Cl. .................. 375/146; 375/147; 375/150; 375/152

(58) Field of Classification Search ............ 375/140, 375/147, 150, 316, 343, 346, 146, 151, 152, 375/153
See application file for complete search history.

(56) References Cited

U.S. PATENT DOCUMENTS 4,041,391 A 8/1977 Derkoski ................. 325/30

5,056,109 A * 10/1991 Gilhousen et al. ........... 370/342

(Continued)

FOREIGN PATENT DOCUMENTS

WO WO 98/23042 5/1998

OTHER PUBLICATIONS

*Wireless LANS: Implementing Interoperable Networks*, J. Geir, Macmillan Technical Publishing, 1999, pp. 47-49, 67-68 (ISBN 1-57870-081-7).

(Continued)

*Primary Examiner*—Chieh M. Fan
*Assistant Examiner*—Jason M. Perilla
(74) *Attorney, Agent, or Firm*—Morgan & Finnegan; Joscelyn G. Cockburn

(57) ABSTRACT

A DSSS system determines transmission reliability of a communication channel in real time. A DSSS transmitter ($f_0=1/T$) generates a Pseudo Noise (PN) code and modulates a carrier source [cos. ($2\Sigma\gamma_c$)] with a selected chip rate. The transmitter bandwidth is a direct function of the chip rate. The PN coded carrier signal is further modulated by a data signal [m(t)] to provide an output signal [s(t)] to a correlator via a communication channel for purposes of determining the transmission characteristic of the channel. The correlator running a variable length pseudo noise code combines the code and the carrier which relates the incoming data signal to a correlation value for detecting the data signal. The correlation value is compared to a threshold value based upon experience of reliable transmission of data through the communication channel. The value of the correlation value declines as the data is attenuated in the communication channel, thus, the band limiting effect of the communication can be determined by the change in the correlation value.

26 Claims, 6 Drawing Sheets

U.S. PATENT DOCUMENTS

| | | | |
|---|---|---|---|
| 5,103,461 A | 4/1992 | Tymes | 375/1 |
| 5,142,550 A | 8/1992 | Tymes | 375/1 |
| 5,315,615 A | 5/1994 | DeLisle et al. | 375/1 |
| 5,555,268 A | 9/1996 | Fattouche et al. | 375/206 |
| 5,732,111 A | 3/1998 | Walley | 375/344 |
| 5,742,583 A | 4/1998 | Scott | 370/18 |
| 5,974,584 A | 10/1999 | Hendrickson et al. | 714/800 |
| 6,047,019 A | 4/2000 | Ishii | 375/206 |
| 6,052,408 A | 4/2000 | Trompower et al. | 375/206 |
| 6,072,807 A | 6/2000 | Daudelin | 370/465 |
| 6,072,998 A | 6/2000 | Kaku | 455/234.2 |
| 6,163,566 A * | 12/2000 | Shiino | 375/143 |
| 6,654,407 B1 * | 11/2003 | Moore, III | 375/141 |
| 6,744,808 B1 * | 6/2004 | Walley et al. | 375/146 |
| 6,944,206 B1 * | 9/2005 | Dent | 375/144 |

OTHER PUBLICATIONS

*A New Serial Search Acquisition Approach With Automatic Decision Threshold Control,* S. Chung, 1995 IEEE 45th Vehicular Technology Conference, V2, pp. 530-536.

*Wireless Communications—Principles and Practice,* T.S. Rapport, Prentice Hall, 1996, Sect. 5.1 (ISBN 0-13-375536-3).

*A New Analysis of Matched Filter Pseudo-Noise Code Acquisition for Direct Sequence Spread Spectrum System,* Sheen et al., 1996 IEEE 4th International Symposium on Spread Spectrum Techniques and Applications Proceedings, Part vol. 1, Aug. 1996, IEEE, pp. 151-155.

* cited by examiner

DYNAMIC MEASUREMENT OF COMMUNICATION CHANNEL CHARACTERISTICS USING DIRECT SEQUENCE SPREAD SPECTRUM (DSSS) SYSTEMS, METHODS AND PROGRAM PRODUCTS

BACKGROUND OF INVENTION

1. Field of Invention

This invention relates to communication systems, methods of operation and program products. More particularly, the invention relates to dynamic measurement of communication channel characteristics using direct sequence spread spectrum (DSSS) systems, methods and program products.

2. Description of Prior Art

A common problem in communication system is improving data transmission reliability between sending and receiving stations. Data transmissions are subject to bandwidth limitations, propagation impairments, noise and other factors. A communication channel which includes means to perform on-the-fly analysis to measure and adjust the channel characteristics for improved reliability would solve a long-standing problem in communication systems. One communication system which measures communication characteristics during transmission is a Direct Spread Spectrum System (DSSS) described in the text Wireless LANS: Implementing Interoperable networks by J. Geir, published by Macmillan Technical Publishing, 1999 at pages 47–49, 67–68 [(ISBN 98-85498)] (ISBN 1-57870-081-7). The measurement is taken for purposes of signal acquisition in synchronizing the Pseudo Noise (PN) codes at the sending and receiving stations. What is needed in the art is a DSSS system which enables the reliability of data transmission in a communication channel to be judged and the transmission adjusted accordingly for improved signal reliability.

Prior art related to DSSS communication systems includes:

(1) An article entitled "A New Serial Search Acquisition Approach With Automatic Decision Threshold Control" by S. Chung, published 1995 IEEE 45$^{th}$ Vehicular Technology Conference, V2, pages 530–536 discloses a CDMA signal acquisition system and uses, in each dwell, an adaptive signal threshold for signal detection and an adaptive signal classification threshold for classifying a signal versus noise. The system uses the detected signal and noise statistics to estimate SNR. The signal detection threshold is obtained from the maximum correlation value of the acquisition process. The signal classification threshold is derived from the average value of the signal detection threshold and noise estimate. If a new signal candidate is detected, both the signal detection threshold and the signal classification threshold are updated. As a result, the signal classification threshold is equivalent to the threshold used in the conventional serial acquisition system. The decision to stop or continue the acquisition search is aided by a pre-verification process.

(2) U.S. Pat. No. 6,052,408 issued Apr. 18, 2000 discloses improving the performance of a cellular communication system using direct sequence spread spectrum techniques. An apparatus and process enable dynamic modification of communication system parameters including PN code length, chipping rate and modulation technique for transmission of a data packet. Modification is based on proximity of the transmitter and receiver, noise level, transmitter and receiver capabilities and other factors. The system makes tradeoffs between data transmission speed and communication range to improve system performance.

(3) U.S. Pat. No. 5,732,111 issued Mar. 23, 1998 discloses a frequency error calibration, estimation and compensation device and method for direct sequence spread spectrum systems, such as digital cordless telephones having a handset and a base station. Initial frequency calibration occurs when the handset is physically coupled to the base station. The allowable frequency error range is divided into a plurality of frequency bins. Both the handset and base station transmit and receive messages using a predetermined frequency offset bin as an estimate of the frequency error. A signal quality value is determined and then a next bin is selected and a next signal quality value is determined. Once a signal quality value has been determined for each frequency bin, a communications link is established between the handset and the base station to allow automatic frequency control tracking to fine tune the frequency offset value. If the signal quality is not above a threshold value, the procedure is repeated. After system calibration, frequency error estimation is performed by cross product demodulation of the received in-phase and quadrature signals. The cross product output is limited and filtered. A phase rotator performs frequency compensation by multiplying the received in-phase and quadrature signals by $(\cos.\text{phi.}(t)+j\sin.\text{phi.}(t))$ where. phi.(t) is the sum of the current phase value and the limited and filtered cross product value.

None of the prior art discloses dynamic measurement of a communication channel using DSSS by extracting a PN code from a received signal using a correlator value and comparing the correlator value to a threshold where a correlator value below the threshold is indicative of unreliable communication in the channel and a correlator value above the threshold indicative of reliable transmission through the channel, the transmission characteristics of the signal being adjusted according to the correlator value—threshold comparison.

SUMMARY OF INVENTION

A DSSS system determines transmission reliability of a communication channel in real time. A DSSS transmitter ($f_0=1/T$) generates a Pseudo Noise (PN) code, which is a sequence of chips with noise-like property. The PN code modulates a carrier source $[\cos(2\Sigma\gamma_c)]$. The transmitter bandwidth is a direct function of the chip rate. The PN coded carrier signal is further modulated by a data signal [m(t)] to provide an output signal [s(t)] via a communication channel to a receiver including a correlator for determining the transmission characteristic of the channel. The correlator is operated with a fixed or variable length pseudo noise code, in the latter case the length depending on the noise content of the system, and is combined with the carrier which relates the incoming data signal to a correlation value for detecting the data signal. The correlation value is generated by correlating the incoming data signal to a copy of the PN code and is compared to a threshold value based upon experience of reliable transmission of data through the communication channel. The correlation value can be computed over any bandwidth and/or frequency band by adjusting the frequency of the pseudo noise code ($f_0$) and/or the carrier frequency ($f_c$). The value of the correlation value declines as the data is attenuated in the communication channel; thus the band limiting effect of the communication can be determined by the change in the correlation value relative to the threshold. The length of the of the pseudo noise code can be adjusted via a separate control processor to compensate for a noisy transmission environment. A control processor adjusts the transmitted signal power and/or a predistortion filter in the data transmitter. The former option would optimize the power consumption by only launching the minimum signal for a given Bit Error Rate (BER) requirement, while the latter would even allow adaptive channel equalization. As the length of the pseudo noise code increases, the correlation variable becomes less acceptable to noise in the transmission medium due to the auto correlation property of the pseudo noise codes. If the threshold value is not exceeded for the largest practical code length, the environment is too noisy for reliable data transmission.

DESCRIPTION OF DRAWINGS

The invention will be further understood from the following detailed description of a preferred embodiment taken in conjunction with an appended drawing, in which.

DESCRIPTION OF PREFERRED EMBODIMENT

Figure 1:
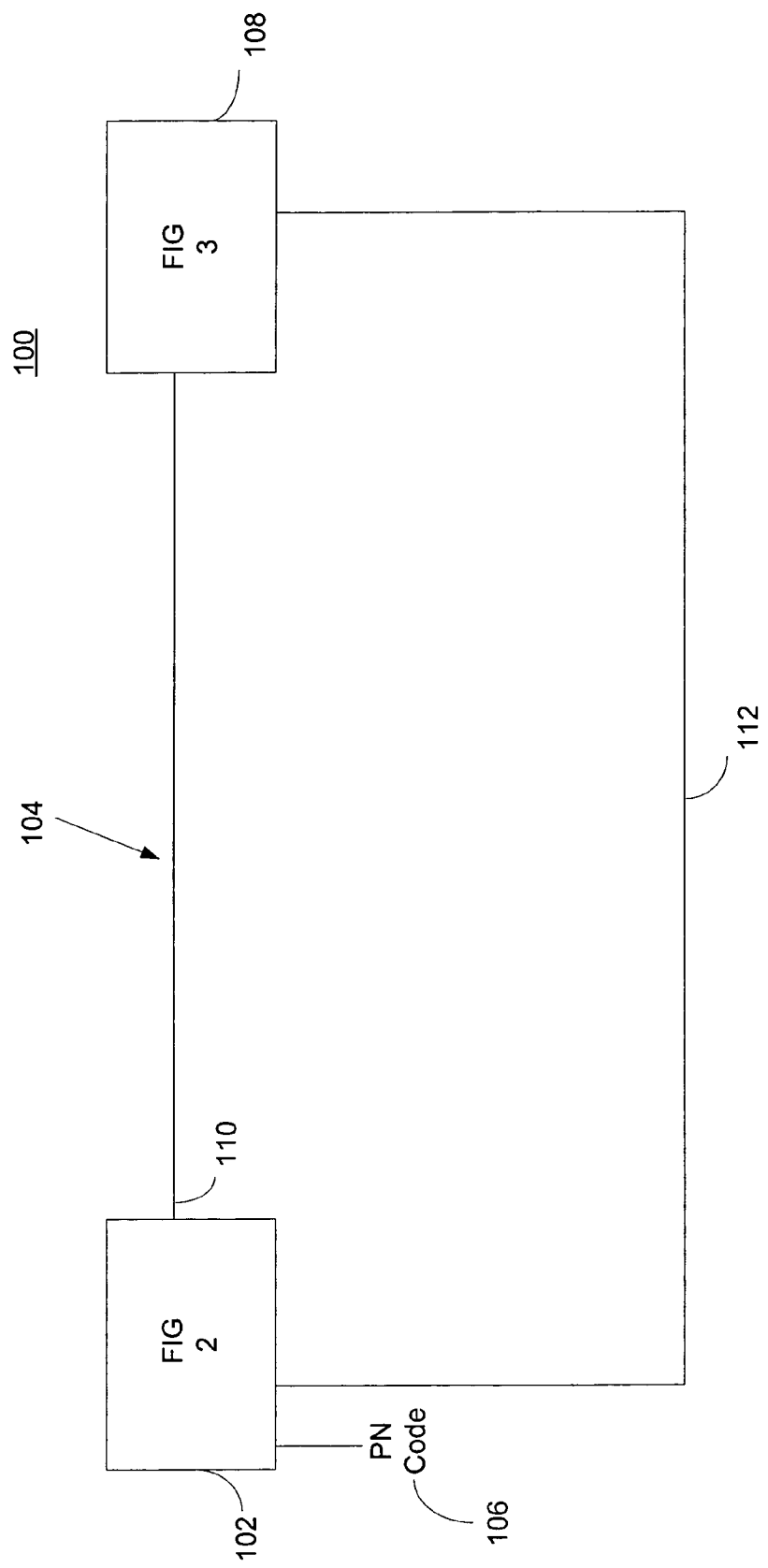
FIG. 1 is a representation of a Direct Sequence Spread System (DSSS) for determining the reliability of a communication channel and incorporating the principles of the present invention.

In FIG. 1, a Spread Spectrum System 100, in one embodiment a Direct Sequence Spread System (DSSS) comprises a transmitter 102 and a receiver 108 coupled to a communications channel 104 for determining and controlling the reliability of the channel for reliable communication between the transmitter and the receiver. DSSS systems are known in the art and described, for example, in the text "Wireless Communications—Principles and Practice" by T. S. Rapport, published by Prentice Hall, Upper Saddle River, N.J., 1996, Sect. 5.1 (ISBN 0113-375536-3). While a DSS System will be described, it should be understood that other Spread Spectrum Systems may be implemented using the principles of the present invention.

The transmitter 102 (to be described hereinafter in conjunction with FIG. 2) generates a spreading waveform that is several orders of magnitude greater than the minimum required signal bandwidth enabling multiple users to simultaneously use the same bandwidth without significant interference with one another. The spreading waveform is controlled by a pseudo noise code 106, which is a sequence of bytes or chips with noise-like properties. The PN code modulates a carrier source where the bandwidth is a direct function of the chip rate. The PN coded carrier signal is further modulated by a data signal to provide an output signal 110, which is applied to the communication channel 104 for purposes of measuring the reliability of the channel. The receiver 108 generates a copy of the transmitter PN code 106, which is combined with a local version of the carrier signal for synchronization with output signal 110 in both code pattern positions; rate of chip generation and carrier fade to obtain an auto-correlation relative to the degree of correspondence between the transmitted signal and the received signal, which is a phase shifted version of the output signal 110. The autocorrelation value provides an indication of the signal to noise ratio of the channel. Based on the signal to noise ratio of the channel, feedback 112 can be supplied to the transmitter for adjustments to the chip rate, length of PN code and carrier frequency for improving the quality and reliability of the communication channel.

Figure 2:
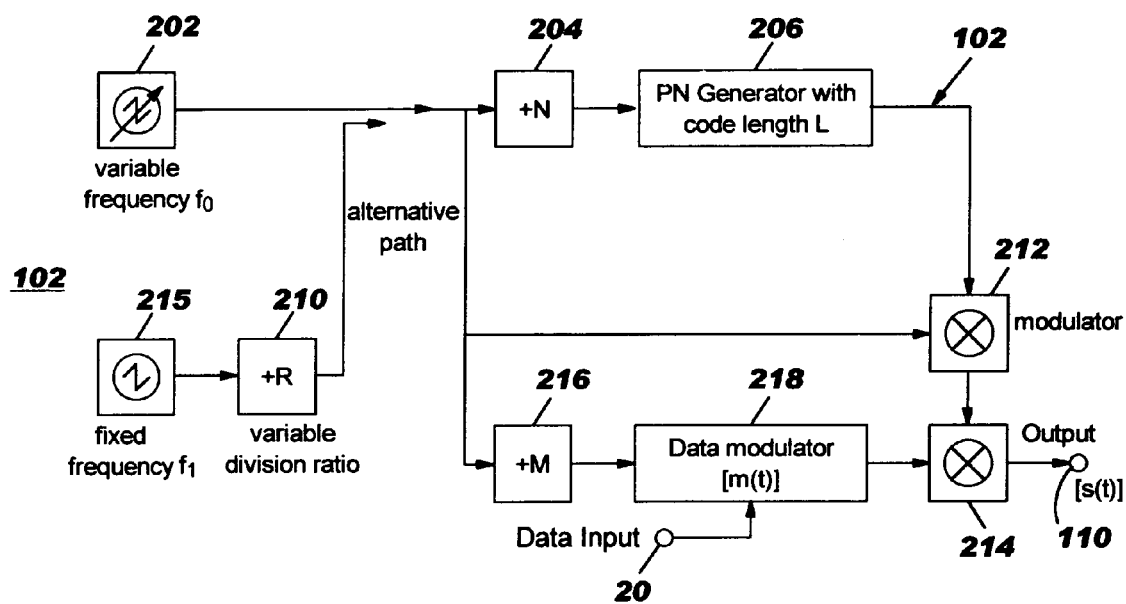
FIG. 2 is representation of a transmitter in the system of FIG. 1.

FIG. 2 provides details of the transmitter 102. A variable frequency generator ($f_0$) 202 provides an input to an analog to digital converter 204 for dividing the signal $f_0$ into a number of bits or chips for application to a PN code generator 206 for selecting the length of a PN code. Alternatively, a fixed frequency generator ($f_i$) 208 may be provided as an output to a divider 210 for selective control of the frequency for the PN generator 206. The frequency $f_0$ or variable frequency $f_1$ is applied to a modulator 212, in which the PN generator modulates the carrier $f_0$ or $f_1$ into a PN code length for application to a data modulator 214. The carrier 202 or 208 is provided to the frequency divider 216, which provides an input to a data modulator 218, responsive to a data input 220. The output of a data modulator is provided to the modulator 214 to provide an output signal [s(t)] 110 where the signal "s" is the PN coded data signal "d" 220 incorporated into the carrier signal $f_0$ 202 or $f_1$ 208.

Figure 3:
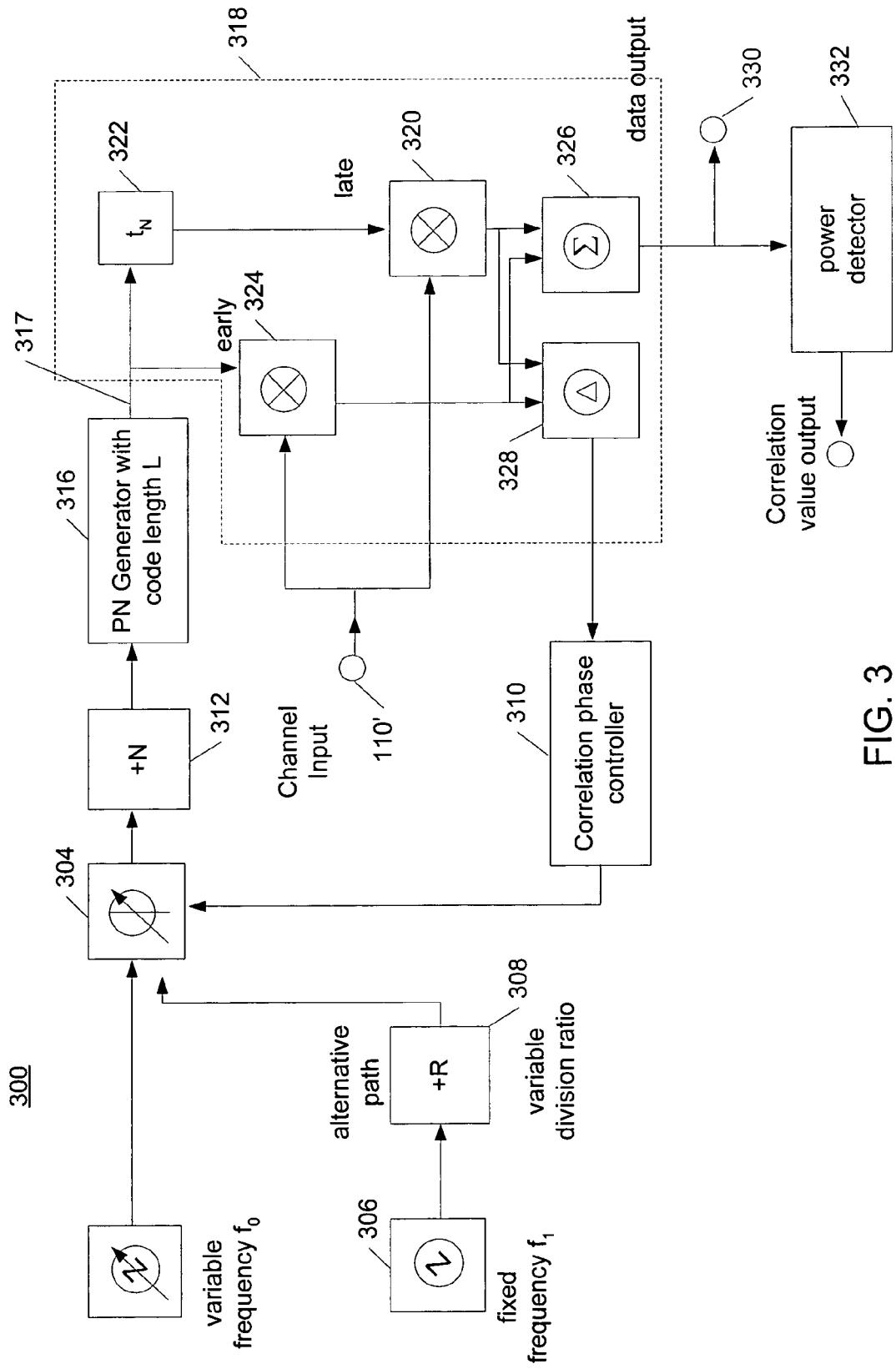
FIG. 3 is a representation of a receiver in the system of FIG. 1.

In FIG. 3, the receiver 108 includes a correlator 300 which generates a local version of the carrier and the pseudo code PN. A variable frequency generator ($f_0$) 302 provides an input to a phase-shifter 304. Alternatively, a fixed frequency ($f_1$) 306 and a frequency divider 308 may be employed to provide an alternate input to the phase-shifter 304. The phase-shifter is under the control of a correlation phase controller 310, as will be described hereinafter. An analog-digital decoder 312 receives the phase shifted $f_o$ or $f_i$ and provides an input to a PN generator 316 to duplicate the PN code 106 in terms of chips, byte length and byte rate. The output of the generator 316 is a duplicated PN code 317, which is provided to a synchronizing circuit 318, which seeks to lock the local generated PN code 317 to the transmitted PN code 106 in terms of byte pattern and phase. To accomplish PN code locking, the generated PN code 317 is provided to a multiplexer 320, via a delay circuit 322, as a late representation of the generated PN code. The generated PN code 317 is also provided to a multiplexer 324 as an early representation of the generated PN code. A channel signal [s(t)] 110 is quite different from that sent by the transmitter 102 at any instant. The received channel signal 110 is subject to a difference in carrier phase due to the channel propagation characteristics between the transmitter and the receiver. As a result, the receiver must synchronize its code sequence to the code sequence on the received signal received 110.

The output of multipliers 320 and 324 represent correlation values for the early and late generated signals with respect to the received phase-shifted input signals. The early and late correlation values are provided to a summing circuit 326 and a difference circuit 328. The early correlation value, when subtracted from the late correlation value, provides an input to the correlation phase controller 310, which adjust the phase-shifter to shift the output of the PN generator 316 until the output of the difference circuit becomes zero and the summing circuit becomes the opposite value or 1 representing synchronization or lock-up of the received signal and the generated signal. When the phase-shifter receives signal [s(t)] is multiplied by a code identical to that used in generating the received signal; the effect is complimentary to the code modulator and the transmitter. The input signal is inverted each time the local correlating code sequence has a 1-0 or a 0-1 transmission. If the transmitter code is identical to the local code and the two codes are time synchronous then at each phase-shift of the transmitters signal, the receiver phase-shifts it again. These complimentary phase-shifts combine to compliment one another and to restore the original carrier.

When the received and generated signals are in synchronization, the input data input signal can be captured at terminal 330. A power detector 332 determines the signal level for measuring the signal level of the output signal and compares the measured signal level to a threshold value based upon experience of reliable transmission of data through the channel. If the correlation value is above the threshold, reliable transmission is occurring through the channel. If the correction value is below the threshold, an indication is given of unreliable transmission though the channel. The power level of the date may be increased to compensate for attenuation on the channel.

Alternatively, the length of the PN code may be adjusted to compensate for the attenuation on the channel. However, as the PN code length increases, the correlation value becomes less susceptible to noise in the transmission medium due to the auto-correlation properties of the pseudo noise code. If the threshold value is not exceeded when the largest practice PN code is used, the environment is too noisy for reliable data transmission.

Figure 3A:
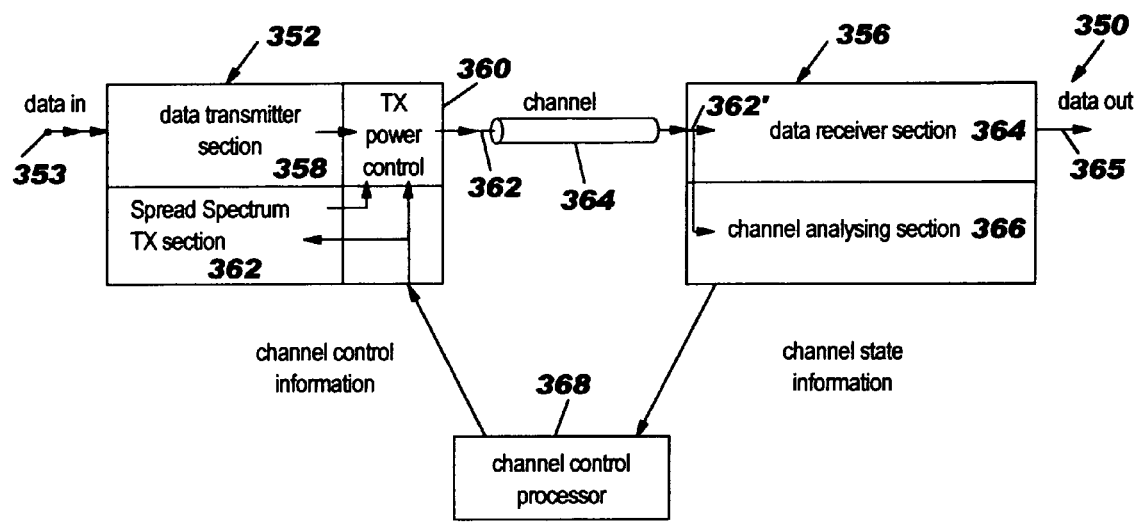
FIG. 3A is a representation of an out-of-band feedback system for adaptive control of the system of FIG. 1.

FIG. 3A discloses an out of band feedback system 350 for adaptive control of a transmitter 352 using DSS measurement of a channel 354 at a receiver 356. The transmitter, 352, based upon FIG. 2, includes a data transmitter section 358 for receiving input data 353 and providing the data to a power control section 360 responsive to a spread spectrum transmitter section 362. The power control section 360 transmits the data 353 across the channel 354 to the receiver 356, as described in FIG. 2.

The receiver 356, based upon FIG. 3, includes a data receiver section 364 for receiving a phase shifted output signal 362. After phase locking and PN code synchronization with the signal 362, a channel analyzing section computes a correlation value for the phase shifted received signal 362'. The correlation value is compared to a threshold value representative of good signal reliability through the channel based upon empirically derived data from the channel. A control signal is generated in the channel analyzing section and provided as an input to a channel processor. When the computed correlation value is below the threshold value, the processor adjusts the transmitter power control section for improved channel reliability. Alternatively, the processor may adjust the PN code length of the spread spectrum section for improved channel reliability. As another alternative, the processor may adjust the bit rate of the spread spectrum section to improve the channel reliability.

Figure 4:
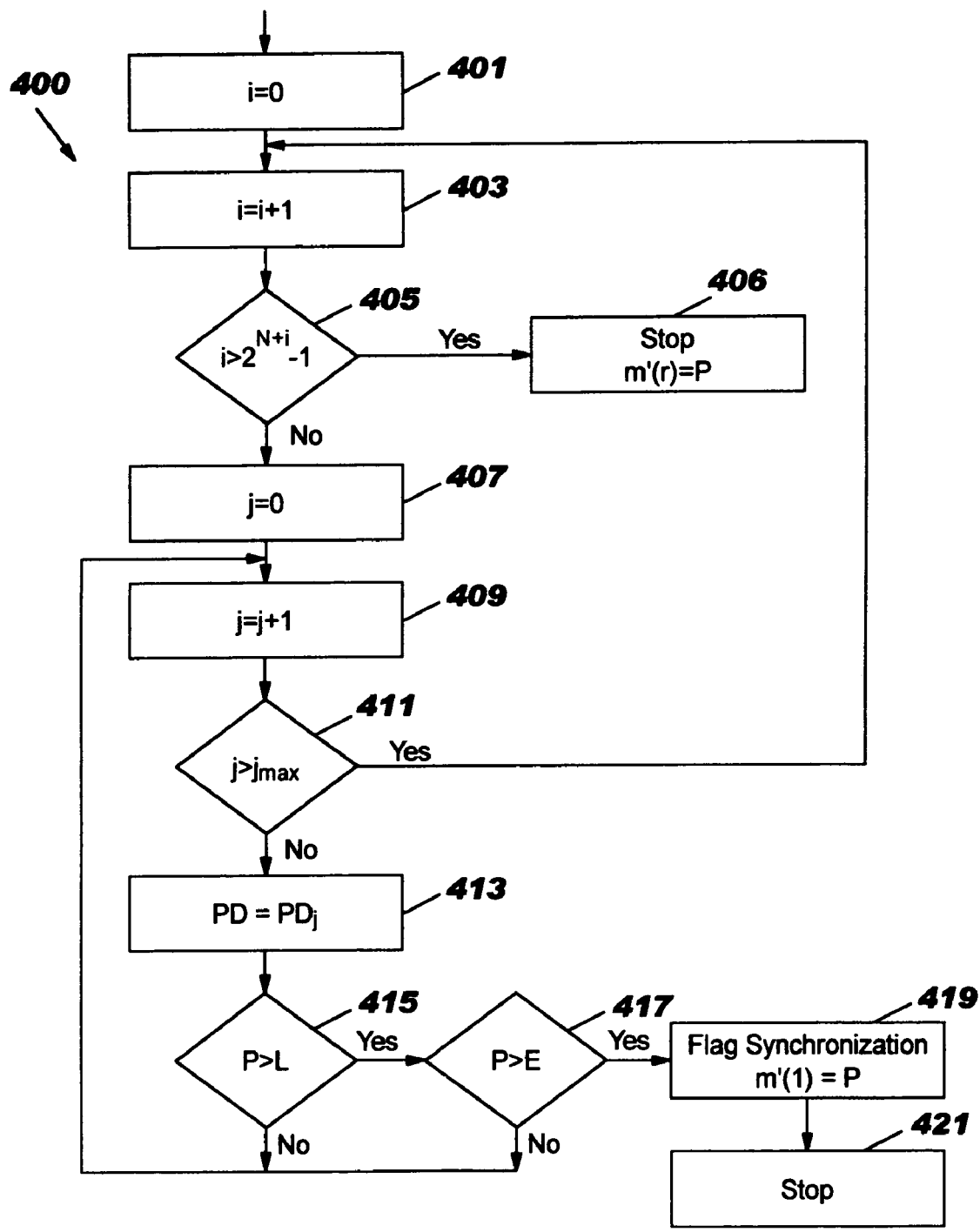
FIG. 4 is a flow diagram for synchronizing PN codes of a transmitter and a receiver in the system of FIG. 1.
Figure 5:
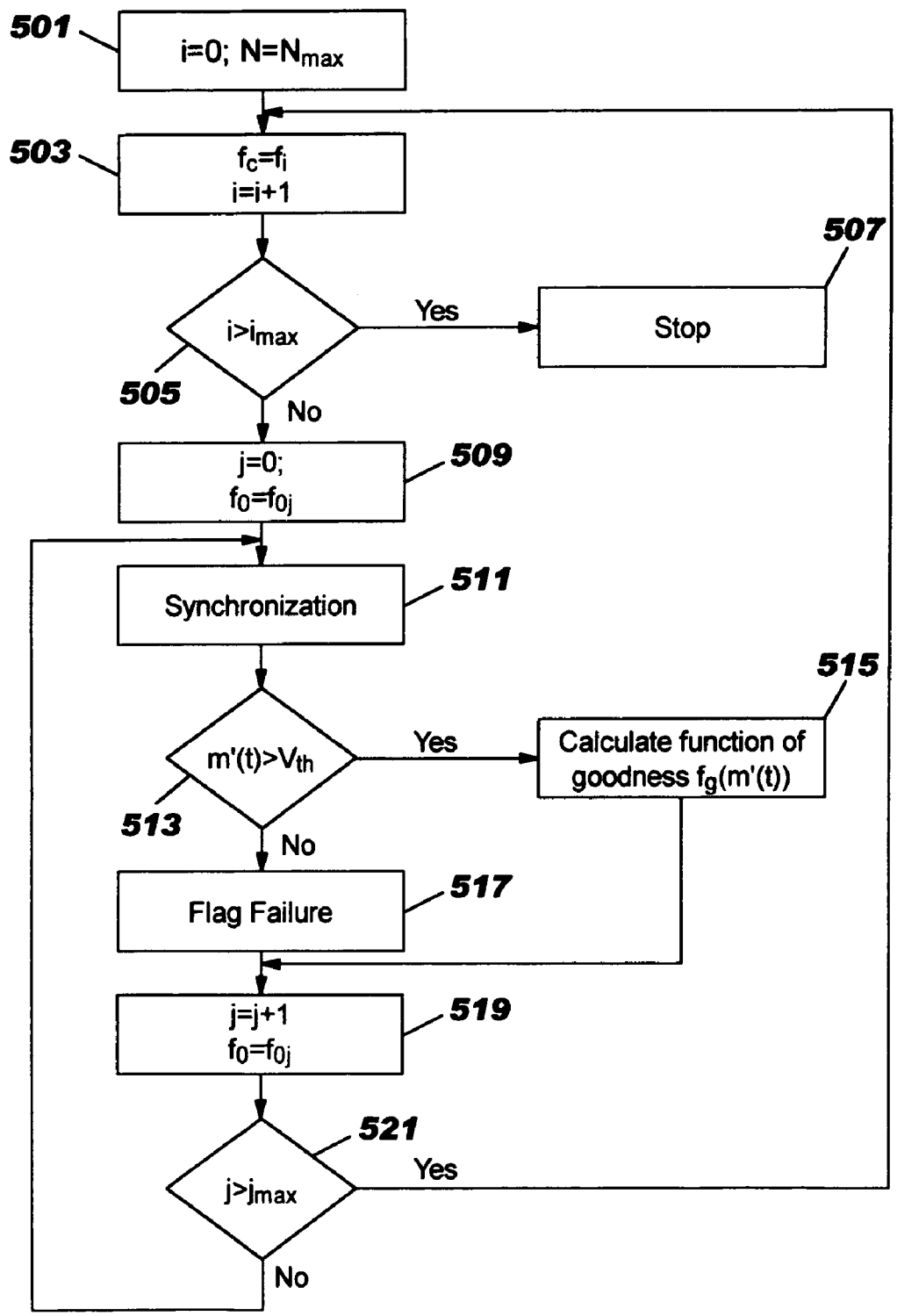
FIG. 5 is a flow diagram for calculating a correlator value for the system of FIG. 1.

FIG. 4 discloses an alternative process 400 for synchronizing the received PN code with the generated code at the receiver 108. In step 401, a counter is initiated at zero for counting each bit in the receiver generated PN code. The counter is incremented for each bit in the generated PN code in step 403 and a correlation value is calculated and compared to a threshold value indicative of reliable transmission through the channel. In step 405, the number of bits (N) in the code is increased until the number of bits is greater than $2^{N+1}-1$, which provides the Peak correlation value (P) for the received signal. After the phase shifted received carrier is phase locked to the receiver-generated version of the carrier the process continues for carrier phase locking by setting a phase difference counter in step 407 for the carrier ($f_c$). The counter is incremented in step 409 until the maximum number carrier phases is reached in step 411 whereupon the process returns to step 403 for continued increase of the PN code bits until the Peak correlation value is reached in step 406 after which the Peak correlation value calculation process ends in step 406. A no condition at step 411 initiates an operation 413, which compares the current phase of the received signal (PD) to the current phase of the peak value of the generated code ($PD_j$). In step 415, a comparison is done between the peak correlation value P and the correlated value for a late comparison of the received and the generated PN codes. If the peak value (P) is greater than the late correlation value, a comparison is made in step 417 to determine if the peak correlation value is greater than the early correlation value between the received and generated PN codes. A yes condition sets a flag in step 419 indicative of carrier FIG. 5 describes a process 500 for determining the goodness of a channel based upon the correlation values determined in FIG. 4. Before calculating the channel goodness, a center frequency counter (i) is set to zero in step 501 for a range of N frequencies to determine the carrier frequency at which the channel goodness will be calculated. The counter 501 is stepped down from the maximum frequency until the center frequency is zero. In step 503, a selected center frequency (fc) is set to (fi) and the counter (i) is incremented by 1. In step 505, the channel frequency is compared to the maximum center frequency. If the maximum center frequency has been reached, the process is stopped in operation 507. If step 505 is NO, a phase counter (j) is set to 0 for center frequency ($f_{oj}$) in operation 509. In an operation 511, the synchronization process 400 described in FIG. 4 is performed on the selected center frequency (foj). In step 513, when the Peak correlation value for the selected center frequency is greater than the threshold value ($V_{th}$), the channel goodness quality is calculated in operation 515 as the difference between the present peak correlation value less the peak correlation value for the previous calculated peak value, after which the process calculates the goodness for the next frequency.

The threshold value is empirically derived based upon the measured channel bit error rate and the measured channel correlation voltage. The goal is to select a threshold value, which is at the limit of the bit error rate for the channel. A typical value for the threshold value is of the order of 1 millivolt. When the channel goodness is above the threshold value, the channel bit error rate is below what is required for reliable channel communication. When the correlation value drops below the threshold, the bit error rate has increased to impair channel reliability. Thus, channel goodness can determine whether there is change or no change in the peak correlation value and steps can be taken to improve the channel reliability by increasing the length of the PN code or changing the bit rate of the code.

Where the peak-correlated value is not greater than the threshold value, a flag is set in an operation 515 to indicate decreased channel reliability. Thereafter, the next sub-frequency N of the center frequency (fo) is checked for phase (foj) and the phase counter is incremented by +1 in an operation 519. The phase (j) is checked against the maximum phase (jmax) in an operation 521. A "yes" condition returns the process to step 503 to select another center sub-frequency (f) for synchronization and calculation of channel goodness. Otherwise, a "no" condition returns the process to the operation 511 where a new center frequency is selected for synchronization and goodness calculation. The process continues until all sub-frequencies of the carrier ($f_c$) have been processed in the operation 505, after which the process ends in the operation 507.

It should be noted that the spread spectrum signaling can make use of system gains enabling channel measurements to be performed in the background while the system transmits signaling and Non-Return To-Zero (NRZ) data.

While the invention has been shown and described in conjunction with the preferred embodiment, various changes can be made without departing from the spirit and scope of the invention as defined in the appended claims, in which:

1. A medium storing program instructions, executable on a computer system for dynamic measurement of a communication channel using a Direct Sequence Spread Spectrum (DSSS) communication system to perform the following steps:
   (a) generating a Pseudo Noise (PN) code signal ($f_0=1/T$) having a length (I), where $f_0$=PN code signal bandwidth, and T=PN code signal chip rate;
   (b) modulating a carrier (cos. $2\pi f_c$) with the PN code signal, where $f_c$=carrier frequency and the carrier frequency varies among a plurality of predetermined carrier frequencies;
   (c) modulating the PN coded carrier with a data signal as a PN coded data carrier signal;
   (d) providing the PN coded data carrier signal to a correlator via a communication channel for determining transmission characteristics of the communication channel; and
   (e) determining a correlator value for each of the plurality of predetermined frequencies of the carrier from the PN coded data carrier signal, where the correlator values are a measure of attenuation loss of the communication channel.

2. The medium storing program instructions of claim 1 further storing instructions for the following steps:
   (f) selecting a Signal to Noise Ratio as a threshold for reliable communication in the channel;
   (g) comparing the plurality of correlation values to the threshold; and
   (h) determining if the correlation values are above or below the threshold, where a correlation value below the threshold is indicative of unreliable transmission trough the channel.

3. The medium storing program instructions of claim 2: wherein the plurality of predetermined carrier frequencies are frequencies relevant for the transmission of the data signal and
   the correlation values vs. frequency is a measure of the frequency dependent loss of the channel.

4. The medium storing program instructions of claim 2 further storing instructions for the following steps:
   (i) adjusting the power level of the data signal to compensate for attenuation of the data signal.

5. The medium storing program instructions of claim 2 further storing instructions for the following steps:
   (i) altering the correlation values by adjusting either the PN code signal ($f_0$) or the carrier frequency ($f_c$).

6. The medium storing program instructions of claim 2 further storing instructions for the following steps:
   (i) adjusting the PN code signal length to compensate for a noisy environment.

7. The medium storing program instructions of claim 2 wherein steps (b) and (c) may be replaced by:
   (b)' modulating the carrier with the data signal, and
   (c)' modulating the data modulated carrier with the PN code signal to produce the PN coded data carrier signal.

8. The medium storing program instructions of claim 1 further storing instructions for the following steps:
   (f) determining the presence of an unreliable data transmission where a predetermined maximum correlator value does not exceed a threshold value.

9. A method of dynamic measurement of a communication channel using a Direct Sequence Spread Spectrum (DSSS) communication system, comprising the steps of:
   (a) generating a Pseudo Noise (PN) code signal ($f_0=1/T$) having a length (I), where $f_0$=PN code signal bandwidth, and T=PN code signal chip rate;
   (b) modulating a carrier (cos. $2\pi f_c$) with the PN code signal, where $f_c$=carrier frequency and the carrier frequency varies among a plurality of predetermined carrier frequencies;
   (c) modulating the PN coded carrier with a data signal as a PN coded data carrier signal;
   (d) providing the PN coded data carrier signal to a correlator via a communication channel for extracting the data signal from the PN coded data carrier signal; and
   (e) determining, from the extracted data signal, a plurality of correlator values via a power detector for each of the plurality of predetermined carrier frequencies of the PN coded data carrier signal, where the plurality of correlator values are a measure of attenuation loss of the communication channel.

10. The method of claim 9 further comprising the steps of:
    (f) selecting a Signal to Noise Ratio as a threshold for reliable communication in the communication channel;
    (g) comparing the plurality of correlation values to the threshold in the power detector; and
    (h) determining if the correlation values are above or below the threshold via the power detector, where a correlation value below the threshold is indicative of unreliable transmission through the communication channel.

11. The method of claim 9 wherein the plurality of predetermined carrier frequencies are frequencies relevant for transmission of the PN coded data carrier signal and the correlation values vs. frequency is a measure of an attenuation loss of the communication channel.

12. The method of claim 10 further comprising the step of:
    (i) adjusting a power level for the PN coded data carrier signal to compensate for attenuation of the communication channel.

13. The method of claim 10 further comprising the step of:
    (i) altering the correlation values in step (e) by adjusting either the PN code signal ($f_0$) or the carrier frequency ($f_c$).

14. The method of claim 10 further comprising the step of:
    (i) adjusting the PN code signal length to compensate for a noisy environment on the communication channel.

15. The method of claim 9 wherein steps (b) and (c) may be replaced by:
    (b)' modulating the carrier with the data signal, and
    (c)' modulating the data modulated carrier with the PN code signal to produce the PN coded data carrier signal.

16. The method of claim 9 further comprising the step of:
    (f) determining the presence of an unreliable data transmission where a predetermined maximum correlator value does not exceed a threshold value.

17. The method of claim 9 further comprising:
    (f) selecting a Signal to Noise Ratio as a threshold for reliable communication in the communication channel;
    (g) comparing the plurality of correlation values to the threshold value wherein determining a correlation value above the threshold is indicative of reliable transmission through the communication channel and the communication channel includes a channel noise signal which determines characteristics of the communication channel.

18. A system of dynamic measurement of a communication channel using a Direct Sequence Spread Spectrum (DSSS) communication system, comprising:
   (a) a code generating apparatus which generates a Pseudo Noise (PN) code signal ($f_0=1/T$) having a length (I), where $f_0$=PN code signal bandwidth, and T=PN code signal chip rate;
   (b) a frequency-controlling apparatus that varies a carrier frequency among a plurality of predetermined frequencies relevant for transmission;
   (c) a carrier modulating apparatus which modulates the carrier (cos. $2\pi f_c$) with the PN code signal where $f_c$=carrier frequency;
   (d) a data modulating apparatus which modulates the PN coded carrier with a data signal as a PN coded data carrier signal;
   (e) a transmitter apparatus which transmits the PN coded data carrier signal to a correlator via a communication channel for determining transmission characteristics of the channel;
   (f) a synchronizing apparatus which determines a correlator value for each of the plurality of predetermined frequencies; and
   (g) a power detector apparatus which keeps track of the plurality of correlator values and thereby determines an attenuation loss of the communication channel.

19. The system of claim 18 wherein the power detector apparatus selects a Signal to Noise Ratio as a threshold for reliable communication in the communication channel, and determines if the plurality of correlation values are above or below the threshold, where a correlation value below the threshold is indicative of unreliable transmission through the communication channel and a correlator value above the threshold is indicative or reliable transmission through the communication channel.

20. The system of claim 19 wherein the power level of the data signal is adjusted to compensate for attenuation of the transmitted data signal.

21. The system of claim 19 wherein the correlation values are altered by adjusting either the chip rate of the PN code signal ($f_0$) or the carrier frequency ($f_c$).

22. The system of claim 19 wherein the length of the PN code signal is adjusted to compensate for a noisy environment.

23. The system of claim 22 wherein the presence of an unreliable data transmission is determined where a predetermined maximum PN code length does not exceed the threshold value.

24. A system of dynamic measurement of a communication channel using Direct Sequence Spread Spectrum (DSSS) communication system, comprising:
   (a) a code generating apparatus which generates a Pseudo Noise (PN) code signal ($f_0=1/T$) having a length (I), where $f_0$=PN code signal bandwidth, and T=PN code signal chip rate;
   (b) a carrier modulating apparatus which modulates a carrier (cos. $2\pi f_c$) with the PN code where $f_c$=carrier frequency where the carrier frequency varies among a plurality of predetermined carrier frequencies;
   (c) a data modulating apparatus which modulates the PN coded carrier with a data signal as a PN coded data carrier signal;
   (d) a transmitter apparatus which transmits the PN coded data carrier signal to a correlator via a communication channel for determining transmission characteristics of the channel; and
   (e) power detecting apparatus which select a Signal to Noise Ratio as a threshold for reliable communication in the communication channel; determines a correlator value for each of the plurality of frequencies of the carrier from the PN coded data carrier signal, and compares the correlation values to the threshold value to determine if the correlation values are above or below the threshold; where a correlation value below the threshold is indicative of unreliable transmission through the communication channel and a correlator value above the threshold is indicative of reliable transmission through the communication channel.

25. A method of dynamic measurement of a communication channel using Direct Sequence Spread Spectrum (DSSS) communication system, comprising the steps of:
   (a) generating a Pseudo Noise (PN) code signal ($f_0=1/T$) having a length (I), where $f_0$=PN code signal bandwidth, and T=Chip rate;
   (b) modulating a carrier (cos. $2\pi f_c$) with the PN code signal, where $f_c$=carrier frequency where the carrier frequency varies among a plurality of predetermined carrier frequencies;
   (c) modulating the PN coded carrier with a data signal as a PN coded data carrier signal;
   (d) providing the PN coded data carrier signal to a correlator via a communication channel for determining transmission characteristics of the communication channel;
   (e) determining a correlator value from the PN coded data signal for each of the plurality of predetermined frequencies of the carrier signal;
   (f) selecting a Signal to Noise Ratio as a threshold via a power detecting apparatus:
   (g) comparing the correlation values to the threshold value; and
   (h) determining if the correlation value for each of the plurality of predetermined frequencies of the carrier signal from the PN coded data carrier signal is above or below the threshold, where the correlator value is a measure of attenuation loss of the communication channel, where a correlation value below the threshold is indicative of unreliable transmission through the communication channel and a correlator value above the threshold is indicative of reliable transmission through the communication channel.

26. A system of dynamic measurement of a communication channel using Direct Sequence Spread Spectrum (DSSS) communication system, comprising:
   (a) a code generating apparatus which generates a Pseudo Noise (PN) code signal ($f_0=1/T$) having a length (I), where $f_0$=PN code signal bandwidth, and T=PN code signal chip rate;
   (b) a carrier modulating apparatus which modulates a carrier (cos. $2\pi f_c$) with the PN code where $f_c$=carrier frequency where the carrier frequency varies among a plurality of predetermined carrier frequencies;

(c) a data modulating apparatus which modulates the PN coded carrier signal with a data signal as a PN coded data carrier signal;

(d) a transmitter apparatus which transmits the PN coded data carrier signal to a correlator apparatus via a communication channel for determining transmission characteristics of the channel;

(e) the correlator apparatus to determine a correlator value from the PN coded data carrier signal for each of the plurality of predetermined frequencies of the carrier signal;

(f) a power detecting apparatus which select a Signal to Noise Ratio as a threshold for reliable communication in the channel, and (g) a comparing apparatus to compare the correlator values to the threshold value; and determine if the correlation values for each of the plurality of predetermined frequencies of the carrier signal from the coded data carrier signal are above or below the threshold; where a correlation value below the threshold is indicative of unreliable transmission through the communication channel and a correlator value above the threshold is indicative of reliable transmission through the communication channel.

* * * * *